US012384069B1

(12) United States Patent
Bechen

(10) Patent No.: US 12,384,069 B1

(45) Date of Patent: Aug. 12, 2025

(54) APPARATUS, SYSTEM, AND METHOD FOR PRODUCING AND POSITIONING MULTI-TIRE STRUCTURAL FEATURES

(71) Applicant: Nicholas R. Bechen, Bellevue, NE (US)

(72) Inventor: Nicholas R. Bechen, Bellevue, NE (US)

( * ) Notice: Subject to any disclaimer, the term of this patent is extended or adjusted under 35 U.S.C. 154(b) by 799 days.

(21) Appl. No.: 17/714,701

(22) Filed: Apr. 6, 2022

Related U.S. Application Data

(60) Provisional application No. 63/171,794, filed on Apr. 7, 2021.

(51) Int. Cl.
*B27F 7/00* (2006.01)
*B27F 7/19* (2006.01)
*B27F 7/30* (2006.01)
*B66C 1/42* (2006.01)

(52) U.S. Cl.
CPC ................ *B27F 7/003* (2013.01); *B27F 7/19* (2013.01); *B27F 7/30* (2013.01); *B66C 1/42* (2013.01)

(58) Field of Classification Search
CPC .... B27F 7/30; B27F 7/19; B27F 7/003; B65B 11/02; B65B 51/05
See application file for complete search history.

(56) References Cited

U.S. PATENT DOCUMENTS 1,403,491 A 1/1922 Eaton
2,614,253 A 10/1952 Crim
3,764,446 A 10/1973 Martin
4,080,793 A 3/1978 Pulsifer
4,188,153 A 2/1980 Taylor
4,761,111 A 8/1988 Brown
5,056,961 A 10/1991 McMeans et al.
5,480,255 A 1/1996 Bernaquez et al.
5,741,528 A 4/1998 Amano et al.
6,139,250 A 10/2000 Nolasco
7,153,082 B2 12/2006 Nolasco
8,636,460 B1 1/2014 Coots
9,434,582 B2 9/2016 Arthur et al.
10,322,443 B2 6/2019 Frost et al.
2004/0105746 A1 6/2004 Nolasco
2008/0019775 A1 1/2008 Johnson et al.
2010/0166531 A1 7/2010 Bauer et al.
2014/0363531 A1 12/2014 Fukuda et al.
2016/0257166 A1 9/2016 Fritel et al.

FOREIGN PATENT DOCUMENTS

RU 2204642 C2 5/2003
WO 2006068519 A1 6/2006

*Primary Examiner* — Daniel Jeremy Leeds

(57) ABSTRACT

A system for producing and positioning multi-tire structural features is disclosed. The system includes a construction vehicle, an actuatable arm extending from the construction vehicle, and a grasper coupled to a distal end of the actuatable arm. The gasper includes a first moving member and a second moving member that are configured to be actuated toward one another when the first moving member is disposed within a first tire and the second moving member is disposed within a second tire. The first moving member comprises a staple driver that is configured to release and force a staple through tire walls of the first and second tires, and the second moving member comprises a staple fastener that is configured to at least partially close the staple after the staple penetrates the tire walls of the first and second tires in order to fasten the first and second tires together.

12 Claims, 6 Drawing Sheets

APPARATUS, SYSTEM, AND METHOD FOR PRODUCING AND POSITIONING MULTI-TIRE STRUCTURAL FEATURES

CROSS-REFERENCE TO RELATED APPLICATIONS

The present application claims the benefit under 35 U.S.C. § 119(e) of U.S. Provisional Application No. 63/171,794, filed Apr. 7, 2021, and titled "APPARATUS, SYSTEM, AND METHOD FOR PRODUCING AND POSITIONING MULTI-TIRE STRUCTURAL FEATURES," which is incorporated herein by reference in its entirety.

TECHNICAL FIELD

The present disclosure relates to construction tools, and more particularly, to a construction tool for fastening two or more tires together to produce structural features.

BACKGROUND

Used tires are often used to construct retaining walls and other structural barriers. Sometimes, the tires may be fastened together to produce multi-tire structural features that are able to withstand strong forces without coming apart. For example, the tires may be tied with rope, chained, or bolted together. The process of fastening the tires together and then positioning the multi-tire structural features is labor intensive and time consuming. Consequently, there is a need for improvements that expedite and simplify the processes of producing and positioning multi-tire structural features.

SUMMARY

A system for producing and positioning multi-tire structural features is disclosed. In embodiments, the system includes a construction vehicle, an actuatable arm extending from the construction vehicle, and a grasper coupled to a distal end of the actuatable arm. The gasper includes a first moving member and a second moving member that are configured to be actuated toward one another when the first moving member is disposed within a first tire and the second moving member is disposed within a second tire. The first moving member comprises a staple driver that is configured to release and force a staple through tire walls of the first and second tires, and the second moving member comprises a staple fastener that is configured to at least partially close the staple after the staple penetrates the tire walls of the first and second tires in order to fasten the first and second tires together.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Reference will now be made in detail to the subject matter disclosed, which is illustrated in the accompanying drawings.

Figure 1:
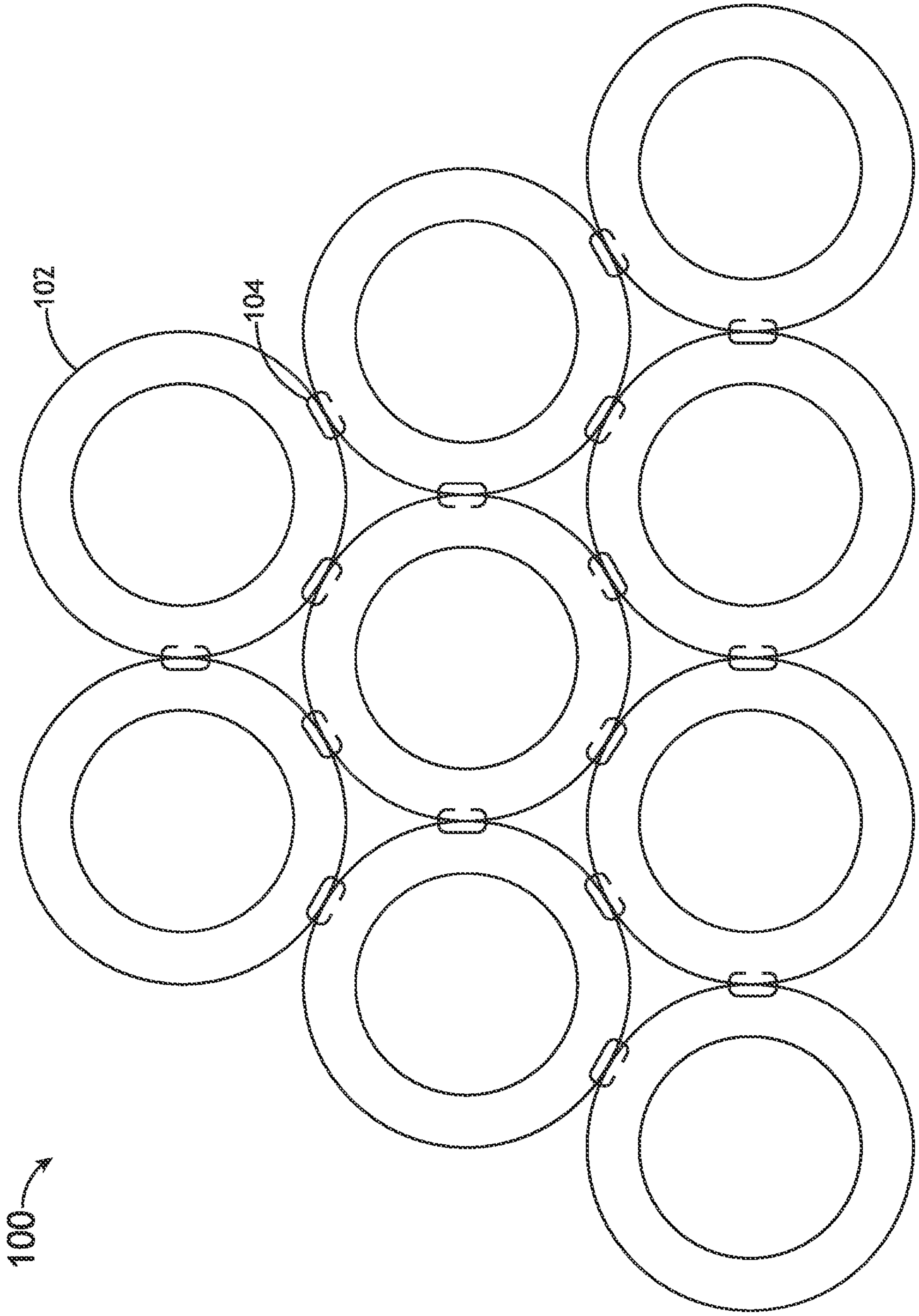
FIG. 1 is a schematic illustration of a multi-tire structural feature, in accordance with an example embodiment of this disclosure.

As shown in FIG. 1, a structural feature 100, such as a wall or boundary, can formed by stacking a plurality of tires 102 upon one another. To enhance the structural performance of the multi-tire structural feature 100, the tires 102 can be attached by fasteners 104 driven through tire walls (e.g., tread walls) of adjacent tires 102.

Referring generally to FIGS. 2 through 6, a system 200 for producing and positioning multi-tire structural features 100 is disclosed.

Figure 2:
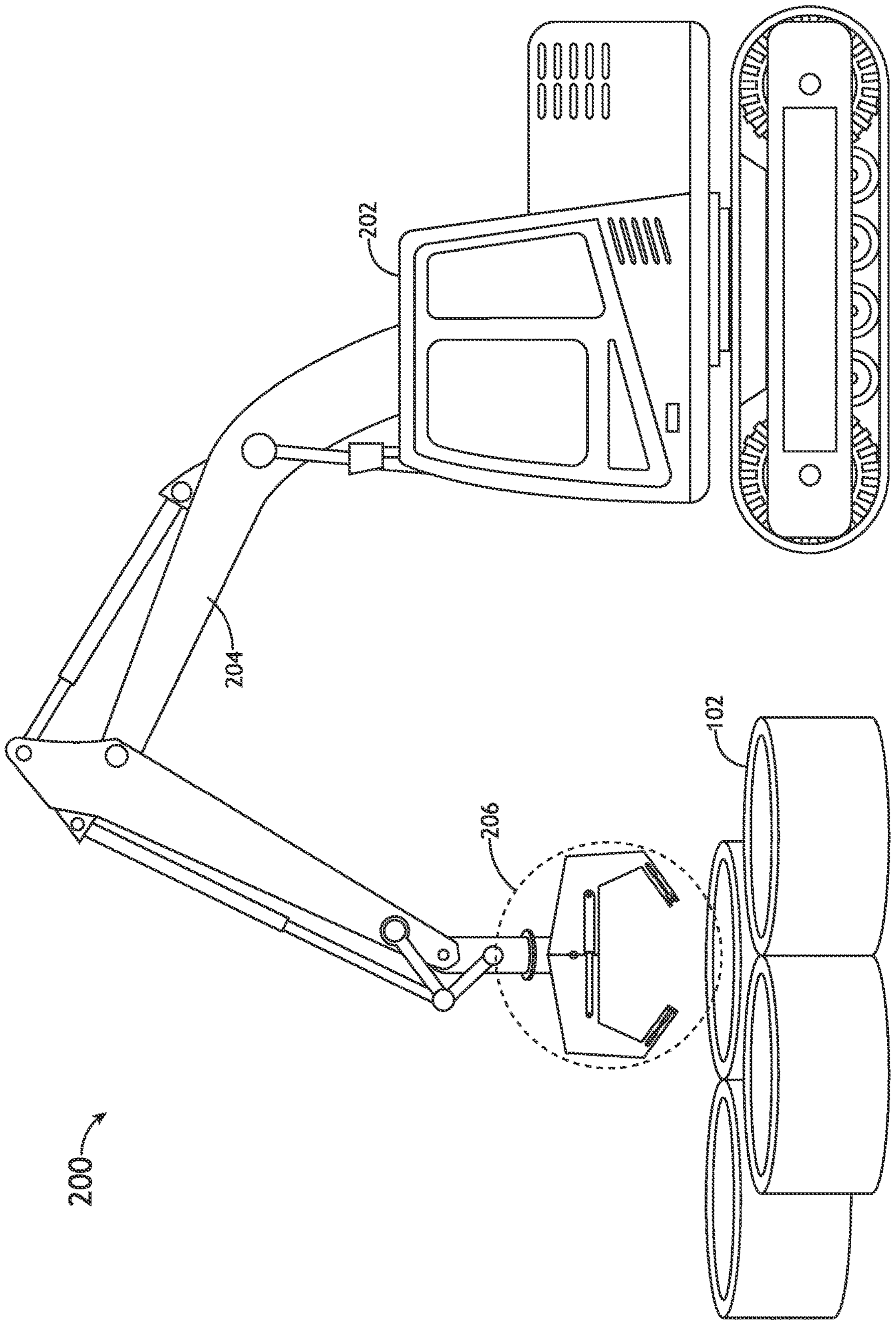
FIG. 2 is a schematic illustration of a system for producing and positioning multi-tire structural features, in accordance with an example embodiment of this disclosure.

An example embodiment of the system 200 is illustrated in FIG. 2. The system 200 may include a construction vehicle 202, an actuatable arm 204 extending from the construction vehicle 200, and a grasper 206 coupled to a distal end of the actuatable arm 204. In some embodiments, the grasper 206 is coupled to the distal end of the actuatable arm 204 by a multi-axis pivot that allows for roll, pitch, and/or yaw rotations of the gasper 206 relative to the actuatable arm 204.

Figure 3:
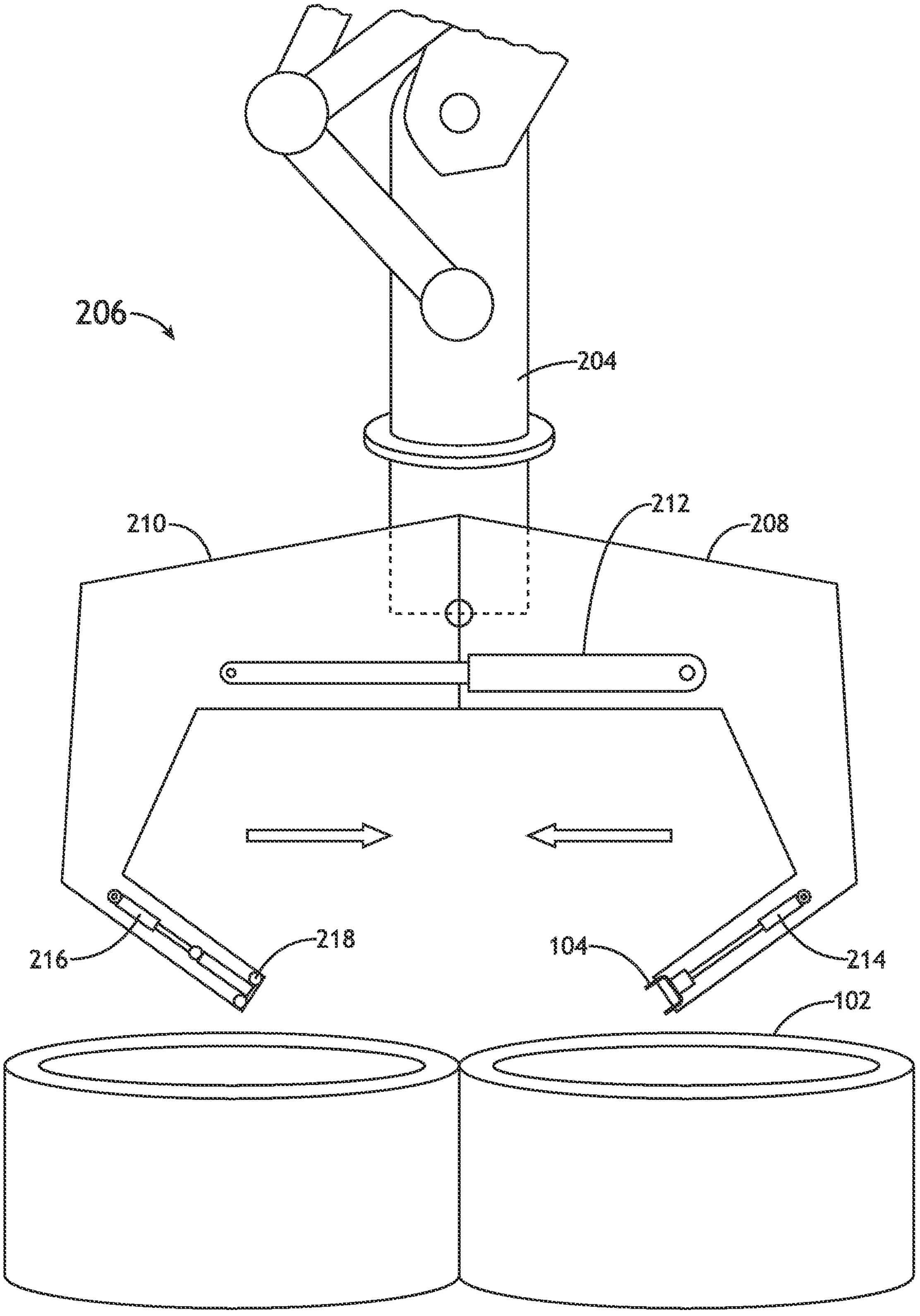
FIG. 3 is a schematic illustration of a grasper of the system for producing and positioning multi-tire structural features, wherein the grasper is in an open configuration, in accordance with an example embodiment of this disclosure.
Figure 4:
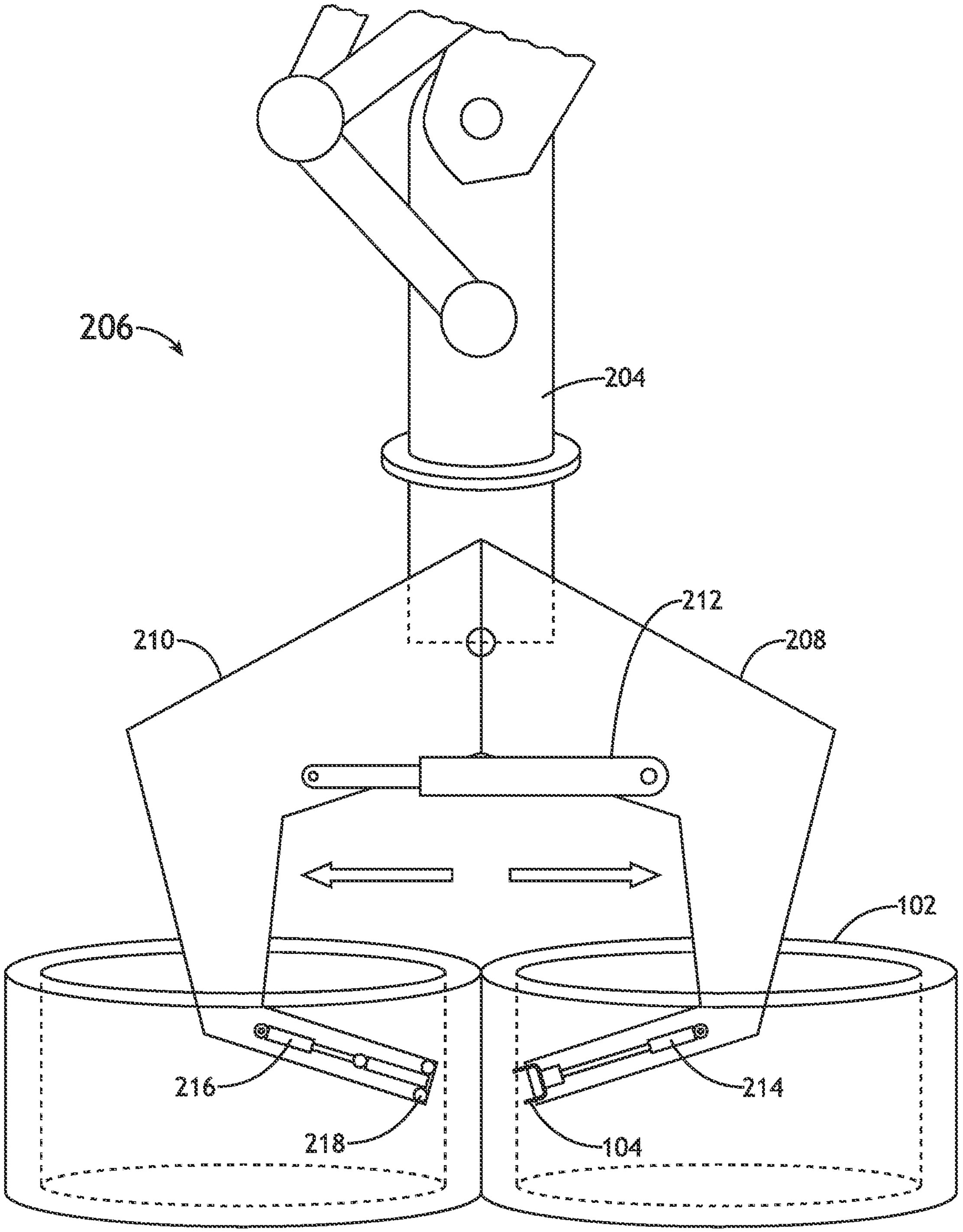
FIG. 4 is another schematic illustration of the grasper of the system for producing and positioning multi-tire structural features, wherein the grasper is in a closed configuration, in accordance with an example embodiment of this disclosure.

As shown in FIGS. 3 and 4, the gasper 206 includes a first moving member 208 and a second moving member 210 that are configured to be actuated toward one another when the first moving member 208 is disposed within a first tire 102 and the second moving member 210 is disposed within a second tire 102. In embodiments, the gasper 206 includes an actuator 212 (e.g., a hydraulic, pneumatic, or electromechanical linear or rotary actuator) that is configured to move the first moving member 208 and the second moving member 210 toward or away from one another (e.g., to gasp or release tires 102 or other objects). In a preferred embodiment, the actuator 212 may be or may include a hydraulic cylinder.

The first moving member 208 includes a staple driver 214 that is configured to release and force a staple 104 through tire walls of the first and second tires 102. In embodiments, the staple driver 214 may be or may include an actuator (e.g., a hydraulic, pneumatic, or electromechanical linear actuator) that is configured to drive the staple 104 through a distal end of the first moving member 208. In a preferred embodiment, the actuator may be or may include a hydraulic cylinder. The first moving member 208 and/or staple driver 214 may further include a staple holder or cartridge configured to hold one or more staples (e.g., an individual staple or a plurality of staples in a cartridge, magazine, or strip).

The second moving member 210 includes a staple fastener 218 that is configured to at least partially close the staple 104 after the staple 104 penetrates the tire walls of the first and second tires 102 in order to fasten the first and second tires 102 together. In some embodiments, the staple fastener 218 includes at least two rollers located at a distal end of the second moving member 210, wherein the staple 104 is bent by the rollers after the staple 104 penetrates the tire walls of the first and second tires 102 in order to fasten the first and second tires 102 together. This results when the distal ends of the moving members 208 and 210 are disposed within the tires 102 and actuated toward one another so that the distal ends of the moving members 208 and 210 are each brought into contact (or near contact) with an inner tire wall of a respective one of the tires 102. At this point the staple driver 214 of the first moving member 208 drives a staple 104 through the tire walls to fasten the tires 102 together, and the staple fastener 218 of the second moving member 210 bends the penetrating prongs of the staple 104 from the other side to secure the staple 104 so that it no longer be removed from the tires 102 (without unbending).

In some embodiments, the second moving member 210 further includes an actuator 216 (e.g., a hydraulic, pneumatic, or electromechanical linear actuator) configured to apply additional force to help close the staple 104 while the staple 104 is being bent by the staple fastener 218 (e.g., rollers) after the staple 104 penetrates the tire walls of the first and second tires 102 in order to fasten the first and second tires 102 together. In a preferred embodiment, the actuator 216 may be or may include a hydraulic cylinder. The actuator 216 may be configured to apply additional force by ramming the staple prongs in between the rollers as the staple 104 is being closed by the staple fastener 218 in order to assist with bending the staple prongs inwardly.

Figure 5:
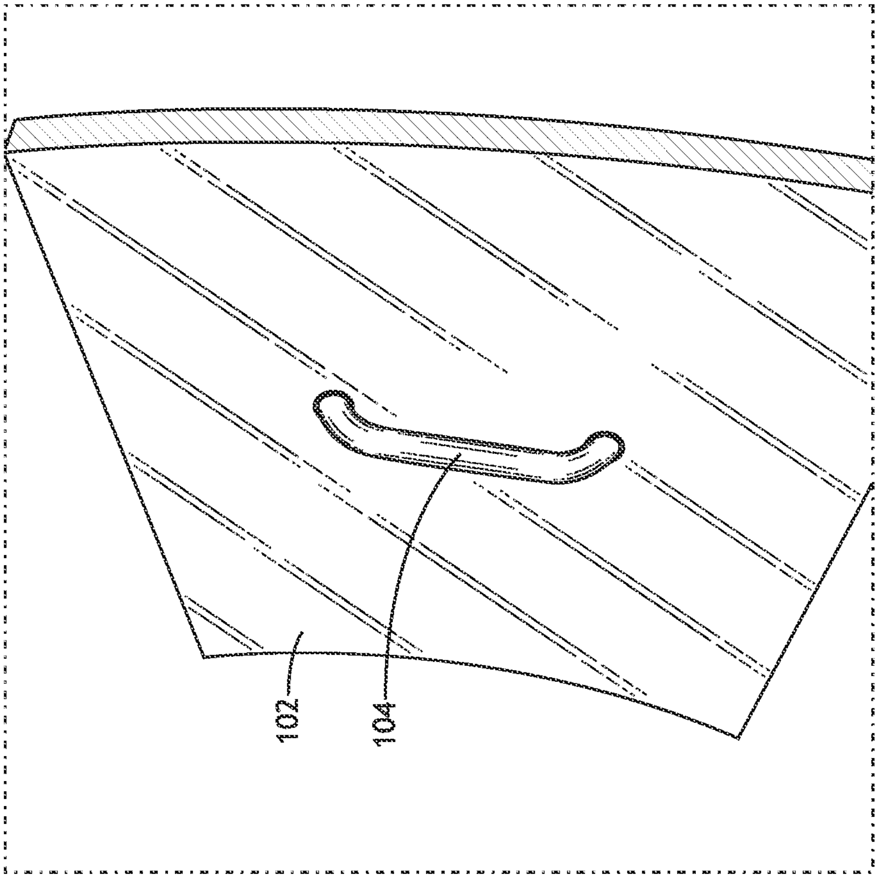
FIG. 5 depicts tire walls of two tires fastened together by the system for producing and positioning multi-tire structural features, in accordance with an example embodiment of this disclosure.
Figure 6:
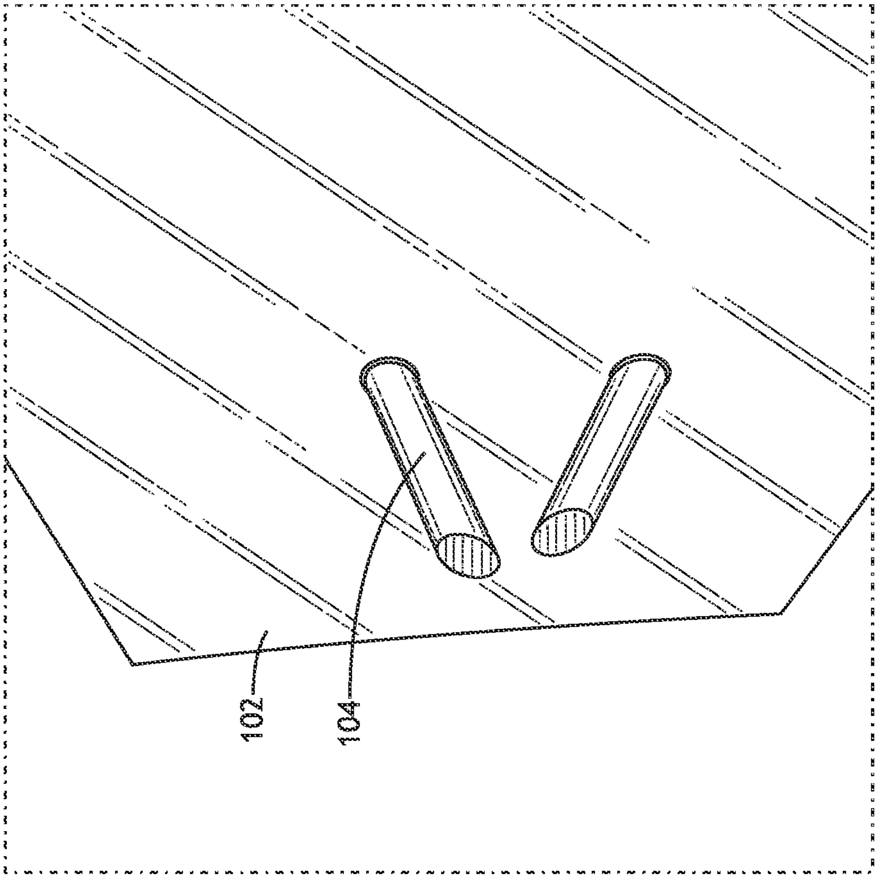
FIG. 6 further depicts the tire walls of the two tires fastened together by the system for producing and positioning multi-tire structural features, in accordance with an example embodiment of this disclosure.

FIGS. 5 and 6 show an example of tire walls of adjacent tires 102 that have been secured by a staple 104 in the manner described herein.

After the tires 102 are fastened together, the grasper 206 and actuatable arm 204 may be further configured to pick up the connected tires 102 and move them to a desired location in order to construct a structure made up of one or more multi-tire tire structural features. The grasper 206 can also be used to fasten one multi-tire structural feature to another multi-tire structural feature and so on.

The grasper 206 and actuatable arm 204 can also be used to move the tires to desired location beforehand (i.e., before the tires 102 are fastened together). In this manner, tires 102 can continually be added to a large structural feature made up of any number of tires 102.

It is further contemplated that the system 200 may be used to fasten and position other building materials or structures (e.g., walls, planks, sheets, arches, etc.).

Although the technology has been described with reference to the embodiments illustrated in the attached drawing figures, equivalents may be employed, and substitutions may be made herein without departing from the scope of the technology as recited in the claims. Components illustrated and described herein are examples of devices and components that may be used to implement the embodiments of the present invention and may be replaced with other devices and components without departing from the scope of the invention. Furthermore, any dimensions, degrees, and/or numerical ranges provided herein are to be understood as non-limiting examples unless otherwise specified in the claims.

What is claimed is:

1. A system for producing and positioning multi-tire structural features, comprising:
- a construction vehicle;
- an actuatable arm extending from the construction vehicle;
- a grasper coupled to a distal end of the actuatable arm, the gasper including a first moving member and a second moving member that are configured to be actuated toward one another when the first moving member is disposed within a first tire and the second moving member is disposed within a second tire, wherein the first moving member comprises a staple driver that is configured to release and force a staple through tire walls of the first and second tires, and wherein the second moving member comprises a staple fastener that is configured to at least partially close the staple after the staple penetrates the tire walls of the first and second tires in order to fasten the first and second tires together.

2. The system of claim 1, wherein the staple driver comprises a linear actuator configured to drive the staple through a distal end of the first moving member.

3. The system of claim 1, wherein the staple fastener comprises rollers located at a distal end of the second moving member, wherein the staple is bent by the rollers after the staple penetrates the tire walls of the first and second tires in order to fasten the first and second tires together.

4. The system of claim 3, wherein the second moving member further includes a linear actuator configured to apply additional force to help close the staple while the staple is being bent by the rollers after the staple penetrates the tire walls of the first and second tires in order to fasten the first and second tires together.

5. An apparatus for producing and positioning multi-tire structural features, comprising:
- a grasper configured to be coupled to a distal end of an actuatable arm, the gasper including a first moving member and a second moving member that are configured to be actuated toward one another when the first moving member is disposed within a first tire and the second moving member is disposed within a second tire, wherein the first moving member comprises a staple driver that is configured to release and force a staple through tire walls of the first and second tires, and wherein the second moving member comprises a staple fastener that is configured to at least partially close the staple after the staple penetrates the tire walls of the first and second tires in order to fasten the first and second tires together.

6. The apparatus of claim 5, wherein the staple driver comprises a linear actuator configured to drive the staple through a distal end of the first moving member.

7. The apparatus of claim 5, wherein the staple fastener comprises rollers located at a distal end of the second moving member, wherein the staple is bent by the rollers after the staple penetrates the tire walls of the first and second tires in order to fasten the first and second tires together.

8. The apparatus of claim 7, wherein the second moving member further includes a linear actuator configured to apply additional force to help close the staple while the staple is being bent by the rollers after the staple penetrates the tire walls of the first and second tires in order to fasten the first and second tires together.

9. A method of producing and positioning multi-tire structural features, comprising:

engaging a first tire and a second tire with a grasper coupled to a distal end of an actuatable arm extending from a construction vehicle, the gasper including a first moving member and a second moving member;

actuating the first moving member and the second moving member toward one another when the first moving member is disposed within the first tire and the second moving member is disposed within the second tire, wherein the first moving member comprises a staple driver, and the second moving member comprises a staple fastener;

releasing and forcing a staple through tire walls of the first and second tires with the staple driver of the first moving member;

closing the staple after the staple penetrates the tire walls of the first and second tires with the staple fastener of the second moving member in order to fasten the first and second tires together; and picking up and relocating the fastened first and second tires using the grasper and the actuatable arm.

10. The method of claim 9, wherein the staple driver comprises a linear actuator configured to drive the staple through a distal end of the first moving member.

11. The method of claim 9, wherein the staple fastener comprises rollers located at a distal end of the second moving member, wherein the staple is bent by the rollers after the staple penetrates the tire walls of the first and second tires in order to fasten the first and second tires together.

12. The method of claim 11, wherein the second moving member further includes a linear actuator configured to apply additional force to help close the staple while the staple is being bent by the rollers after the staple penetrates the tire walls of the first and second tires in order to fasten the first and second tires together.

* * * * *